(12) United States Patent
Kim et al.

(10) Patent No.: US 8,983,379 B2
(45) Date of Patent: Mar. 17, 2015

(54) DATA TRANSMITTING AND RECEIVING APPARATUS AND METHOD, AND SOLID STATE DRIVE INCLUDING THE SAME

(75) Inventors: Chul Bum Kim, Seoul (KR); Jangwoo Lee, Seoul (KR); Changsik Yoo, Seoul (KR); Minki Jeon, Seoul (KR)

(73) Assignees: Samsung Electronics Co., Ltd., Suwon-si, Gyeonggi-do (KR); Industry-University Cooperation Foundation Hanyang University, Seoul (KR)

( * ) Notice: Subject to any disclaimer, the term of this patent is extended or adjusted under 35 U.S.C. 154(b) by 210 days.

(21) Appl. No.: 13/604,753

(22) Filed: Sep. 6, 2012

(65) Prior Publication Data

US 2013/0143490 A1 Jun. 6, 2013

(30) Foreign Application Priority Data

Dec. 1, 2011 (KR) .................. 10-2011-0127409

(51) Int. Cl.
*H04B 5/00* (2006.01)
*H04B 1/10* (2006.01)

(52) U.S. Cl.
CPC ............ *H04B 5/0031* (2013.01); *H04B 5/0081* (2013.01)
USPC ........................................ 455/41.1; 455/296

(58) Field of Classification Search
USPC ........ 455/41.1, 63.1, 296, 303, 304; 340/10.1
See application file for complete search history.

(56) References Cited

U.S. PATENT DOCUMENTS

| 7,215,764 | B2* | 5/2007 | Apfel ...................... 379/399.01 |
| 7,538,603 | B2 | 5/2009 | Ikeda et al. |
| 2005/0122186 | A1 | 6/2005 | Podell |
| 2010/0243737 | A1* | 9/2010 | Kargl et al. .................. 235/439 |
| 2010/0311328 | A1* | 12/2010 | Kargl et al. .................. 455/41.2 |
| 2011/0074348 | A1 | 3/2011 | Villa Gazulla et al. |

FOREIGN PATENT DOCUMENTS

| JP | 2007-329894 | 12/2007 |
| JP | 2011-066515 | 3/2011 |

* cited by examiner

*Primary Examiner* — Nguyen Vo
(74) *Attorney, Agent, or Firm* — Volentine & Whitt, PLLC

(57) ABSTRACT

A data transmitting and receiving apparatus includes a coil configured to transmit and receive data through inductive coupling, where a voltage drop across the coil constitutes a sensing signal. The apparatus further includes an input unit configured to generate transmission data and a replica signal in accordance with an input data signal, the transmission data being supplied to the coil. The apparatus still further includes a replica unit configured to generate a compensation signal in accordance with the replica signal, and an output unit configured to extract reception data from the sensing signal using the compensation signal.

20 Claims, 9 Drawing Sheets

DATA TRANSMITTING AND RECEIVING APPARATUS AND METHOD, AND SOLID STATE DRIVE INCLUDING THE SAME

CROSS-REFERENCE TO RELATED APPLICATIONS

A claim of priority under 35 USC §119 is made to Korean Patent Application No. 10-2011-0127409, filed on Dec. 1, 2011, the entirety of which is hereby incorporated by reference.

BACKGROUND

The present general inventive concept generally relates to the transmission and reception of data, and more particularly, the invention concept relates to the utilization inductive coupling to transmit and receive data.

Inductive coupling is utilized as a type of near field contactless communication technology. When compared to other near field contactless communication technologies, such as radiofrequency identification (RFID), inductive coupling advantageously exhibits relatively high transmission rates and low power consumption.

In addition to contactless communication between separate devices, inductive coupling may be utilized within a device, such as solid-state drive (SSD), where a plurality of integrated circuits (ICs) is stacked in a single package. Here, inductive coupling may be used to realize data communication between the stacked ICs.

One drawback of conventional inductive coupling techniques is that there are not capable of simultaneously performing interactive communication over a single channel. This is primarily because echo noise generated by inductance is not effectively eliminated during the interactive communication. For example, an integrated circuit that is transmitting data must stop transmission in order to receive data. Accordingly, interactive communication utilizing conventional inductive coupling is performed through timing control, which can narrow the effective bandwidth.

SUMMARY

In an aspect of embodiments of the inventive concept, a data transmitting and receiving apparatus includes a coil configured to transmit and receive data through inductive coupling, where a voltage drop across the coil constitutes a sensing signal. The apparatus further includes an input unit configured to generate transmission data and a replica signal in accordance with an input data signal, the transmission data being supplied to the coil. The apparatus still further includes a replica unit configured to generate a compensation signal in accordance with the replica signal, and an output unit configured to extract reception data from the sensing signal using the compensation signal.

In another aspect of the inventive concept, a data transmitting and receiving method includes receiving an input data signal, generating a transmission data and a replica signal in accordance with the input data signal, and transmitting the transmission data inductively via an induction coil and receiving reception data inductively via the induction coil, where a voltage drop across the coil constitutes a sensing signal. The method further includes generating a compensation signal in accordance with the replica signal, and extracting the reception data from the sensing signal using the compensation signal.

In yet another aspect of embodiments of the inventive concept, a solid state drive (SSD) includes a plurality of stacked semiconductor chips, at least one of which is memory chip, where each of the semiconductor chips includes a contactless communication terminal. The contactless communication terminal includes a coil configured to transmit and receive data through inductive coupling, where a voltage drop across the coil constitutes a sensing signal. The terminal further includes an input unit configured to generate transmission data and a replica signal in accordance with an input data signal, the transmission data being supplied to the coil. The terminal still further includes a replica unit configured to generate a compensation signal in accordance with the replica signal, and an output unit configured to extract reception data from the sensing signal using the compensation signal.

BRIEF DESCRIPTION OF THE DRAWINGS

The inventive concept will become more apparent in view of the accompanying drawings and detailed description that follows. The embodiments depicted therein are provided by way of example, not by way of limitation, wherein like reference numerals refer to the same or similar elements. The drawings are not necessarily to scale, emphasis instead being placed upon illustrating aspects of the inventive concept.

DETAILED DESCRIPTION

The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept.

In the present specification, the terms "comprise" and/or "comprising" specify existence of shapes, numbers, steps, operations, members, elements, and/or groups thereof, which are referred to, and do not exclude existence or addition of one or more different shapes, numbers, operations, members, elements, and/or groups thereof. Hereinafter, embodiments of the inventive concept will now be described more fully with reference to accompanying drawings.

Figure 1:
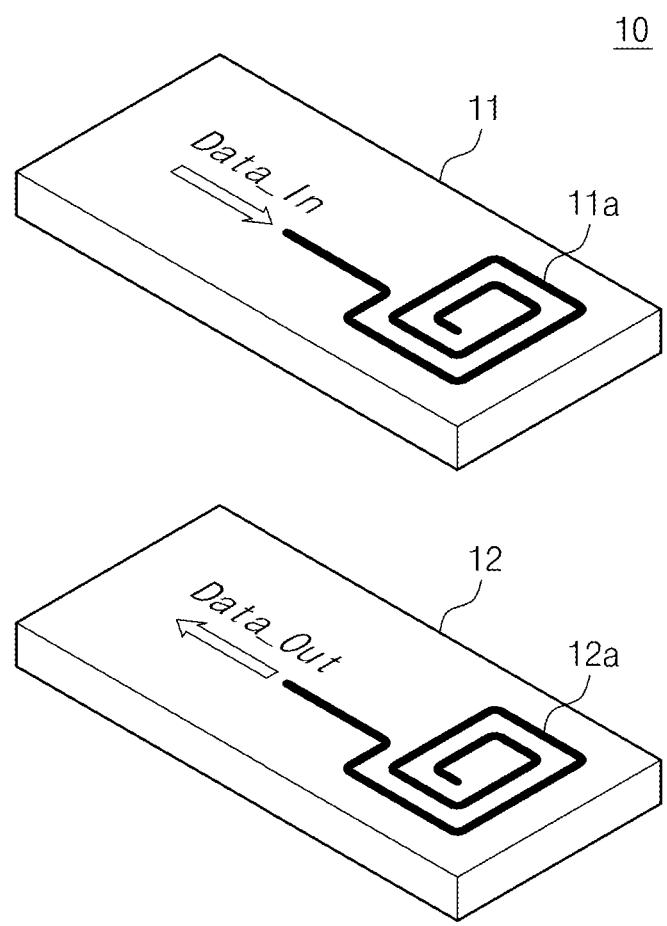
FIG. 1 is a schematic view a data transmitting and receiving apparatus for use in describing the concept of inductive coupling.
Figure 3:
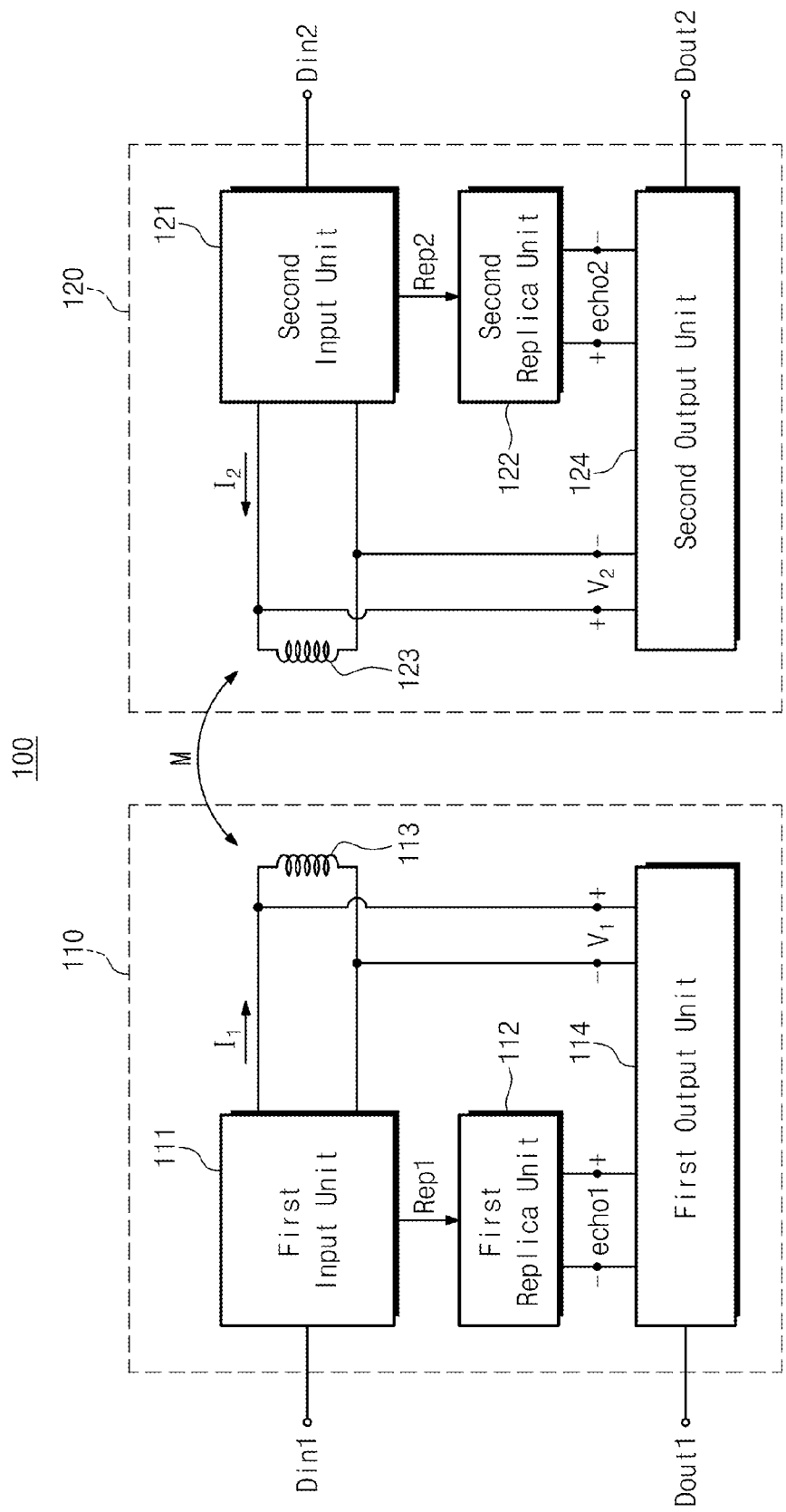
FIG. 3 is a block diagram of a data transmitting and receiving apparatus according to an embodiment of the inventive concept.

Reference is initially made to FIGS. 1 and 3 for a discussion of transmission by inductive couple generally.

FIG. 1 illustrates a data transmitting and receiving apparatus 10. As shown, the apparatus 10 generally includes a first circuit unit 11 and a second circuit unit 12.

The first circuit unit 11 and the second circuit unit 12 include a first coil 11a and a second coil 12a, respectively. In FIG. 1, the first circuit unit 11 functions as a transmitting circuit and the second circuit 12 functions as a receiving circuit. When transmission data is provided to the first coil 11a of the first circuit unit 11, voltage fluctuation of the first coil 11a is transferred to the second coil 12 as an electrical signal by magnetic coupling of the first coil 11a and the second coil 12a. The electrical signal transferred to the second coil 12a is output through an output terminal connected to the second coil 12a. Near field contactless communication performed in this manner is referred to herein as inductive coupling communication.

Figure 2:
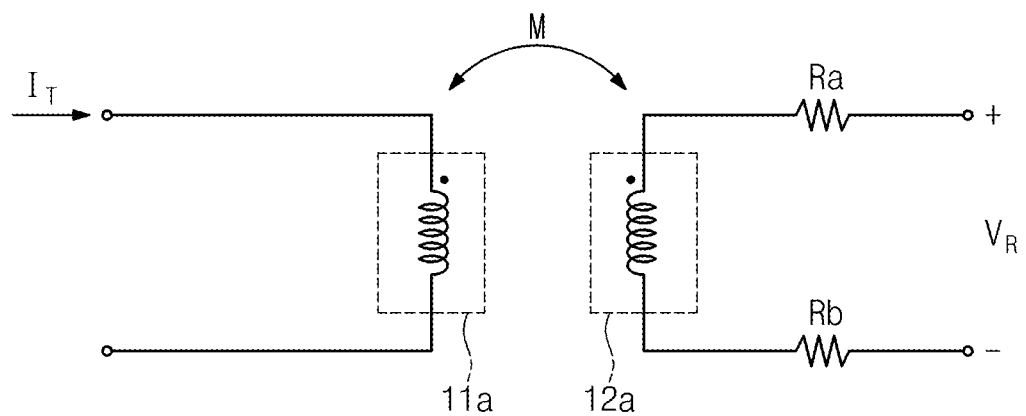
FIG. 2 is a circuit diagram for use in describing data transmission based on inductive coupling.

FIG. 2 is a circuit diagram generally corresponding to the apparatus shown in FIG. 1. Here, the transmission coil 11a is connected to a transmission terminal. The receiving coil 12a and its parasitic resistors Ra and Rb are connected in series to a receiving terminal.

In operation, a data transmission current $I_T$ is provided to the transmission coil 11a. When the transmission current $I_T$ flows through the transmission coil 11a, a magnetic field around the transmission coil 11a is altered. This variation in the magnetic field leads to voltage (or current) fluctuation at the receiving terminal connected to the receiving coil 12a. A receiving terminal voltage $V_R$ has a close relationship to change over time of the transmission current $I_T$. Accordingly, the transmission current $I_T$ may be detected from the receiving terminal voltage $V_R$. A relationship between the receiving terminal voltage VR and the transmission current IT is shown below.

$$\text{Time domain: } V_R(t) = M \frac{dI_T(t)}{dt}$$

$$\text{Frequency domain: } V_R(\omega) = j\omega M I_T(\omega)$$

In these equations, t represents time, ω represents a frequency, and M represents a mutual inductance the transmission coil 11a and the receiving coil 12a. The mathematical relationships represented by these equations are well known in the art and are thus not explained in further detail here.

Reference is now made to FIG. 3, which is a block diagram of a data transmitting and receiving apparatus 100 according to the inventive concept. The data transmitting and receiving apparatus 100 of this example includes a first circuit unit 110 and a second circuit unit 120. The first and second circuit units 110 and 120 may each function as a transmitting unit and/or a receiving unit. Indeed, as explained below, the first and second circuit units 110 and 120 transmit and receive data at the same time.

The first circuit unit 110 includes a first input unit 111, a first replica unit 112, a first coil 113, and a first output unit 114.

The first input unit 111 provides transmission data $I_1$ with reference to an input signal Din1. In an exemplary embodiment, the transmission data $I_1$ is a current signal. The first input unit 111 provides a replica signal Rep1 with reference to the input signal Din1.

The first coil 113 transfers the transmission data $I_1$ to the second circuit unit 120 through inductive coupling. Likewise, the first coil 113 receives a signal $I_2$ transmitted from the second circuit unit 120. The transmission data $I_1$ and the transmitted signal $I_2$ lead to fluctuation of a voltage at both ends of the first coil 113, respectively. The voltage at both ends of the first coil 113 is transferred to the first output unit 114 as a sensing signal $V_1$.

The first replica unit 112 generates a compensation signal echo1 with reference to the replica signal Rep1. As will be described later, the replica signal Rep1 has waveform corresponding to the input signal Din1. The compensation signal echo1 may have another waveform depending on the configuration of the replica unit 112.

The output unit 114 removes noise from the sensing signal $V_1$ with reference to the sensing signal $V_1$ and the compensation signal echo1. Specifically, the first output unit 114 detects a signal $I_2$ transferred from the sensing signal V1. The detected signal $I_2$ is provided as an output Dout1.

Similar to the first circuit unit 110, the second circuit unit 120 transmits and receives data through inductive coupling. The configuration and operation of the second circuit unit 120 are substantially identical to those of the first circuit unit 110 and are thus not described in further detail here.

According to the above-described configuration, transmission and reception of data may be carried out at the same time through one channel formed by magnetic coupling of the first coil 113 and the second coil 123. Thus, the data transmitting and receiving apparatus 100 exhibits a relatively high data transfer rate and effective bandwidth.

Figure 4:
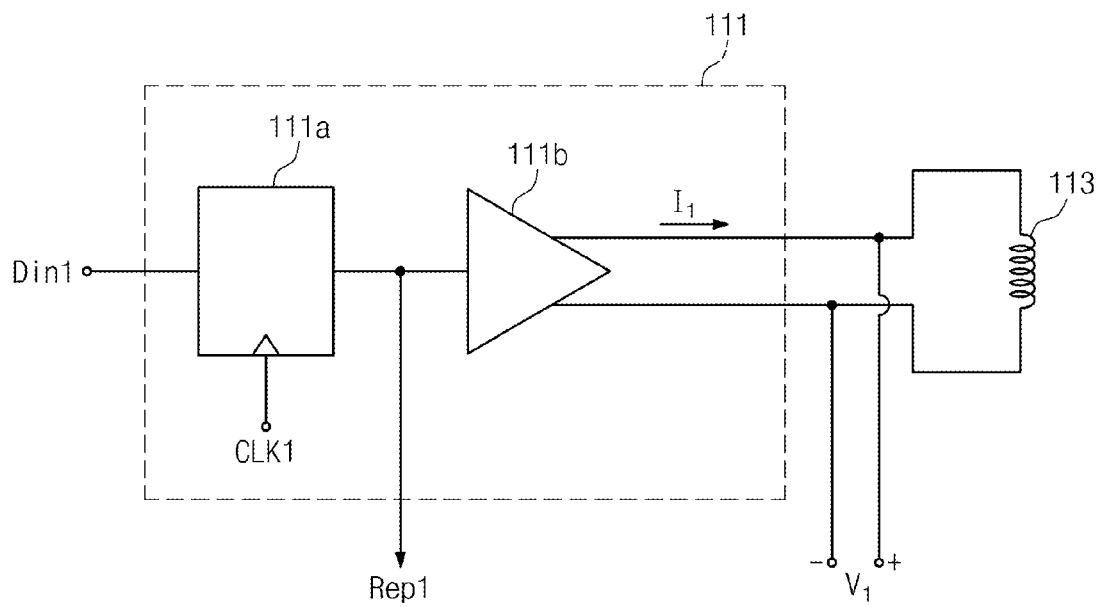
FIG. 4 is a block diagram of a first input unit shown in FIG. 3 according to an embodiment of the inventive concept.

Reference is made to FIG. 4, which is a block diagram showing an embodiment of the first input unit 111 shown in FIG. 3. As shown, the first input unit 111 of this example includes a flip-flop 111a and a driver 111b.

The flip-flop 111a buffers an input signal Din1 and provides the buffered signal as an output. The buffered signal is provided to a first coil 113 through the driver 111b. The flip-flop 111a operates in synchronization with a clock signal CLK1. In an exemplary embodiment, the flip-flop 111a holds the input signal Din1 at the rising edge of the clock signal CLK1. The flip-flop 111a provides the held input signal Din1 to the next rising edge of the clock signal CLK1 as an output. An output of the flip-flop 111a is provided as a replica signal Rep1.

The driver 111b receives the output of the flip-flop 111a to provide transmission data $I_1$ to a first coil 113. Since current flowing through the first coil 113 cannot change discretely, transmission data $I_1$ has a slope near the rising or falling edge of the output of the flip-flop 111a.

According to the above-described configuration, the first input unit 111 provides the transmission data $I_1$ to the first coil 113 with reference to the input signal Din1 and provides the replica signal Rep1 having a waveform corresponding to the transmission data $I_1$.

Figure 5:
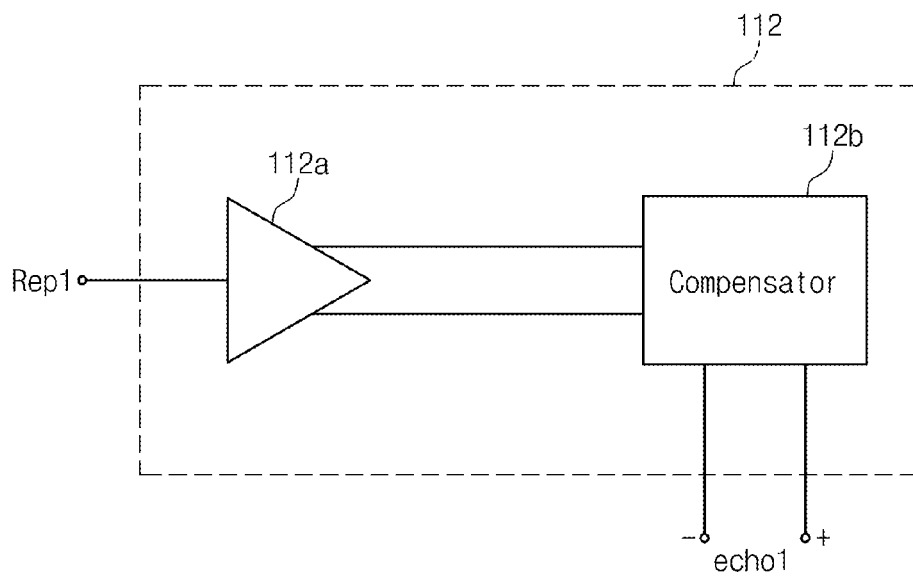
FIG. 5 is a block diagram of a first replica unit shown in FIG. 3 according to an embodiment of the inventive concept.

Reference is made to FIG. 5 which is a block diagram of an embodiment of the first replica unit 112 shown in FIG. 3. The first replica unit 112 of this example includes a replica driver 112a and a compensator 112b.

The replica driver 112a provides a current signal to the comparator 112b with reference to a replica signal Rep1. In an exemplary embodiment, the replica driver 112a may function as a buffer. Also in an exemplary embodiment, the replica driver 112a may amplify or attenuate the replica signal Rep1 and provide the amplified or attenuated signal to the compensator 112b.

Figure 6:
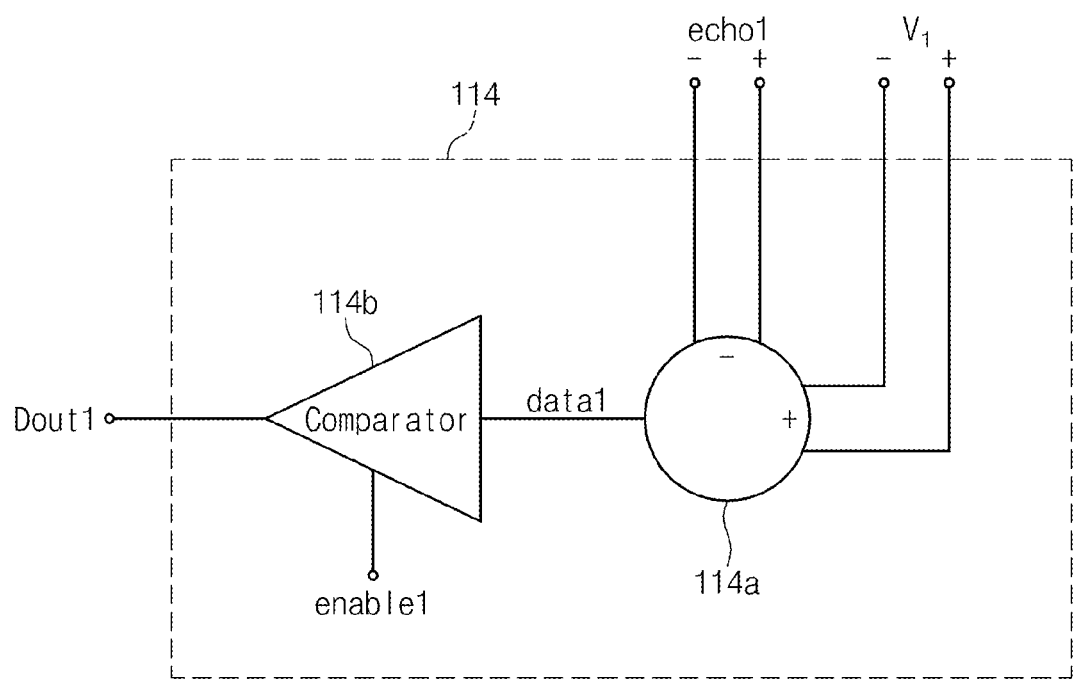
FIG. 6 is a block diagram of a first output unit shown in FIG. 3 according to an embodiment of the inventive concept.

The compensator 112b receives a current signal from the replica driver 112a to provide a compensation signal echo1. As will be described later, the compensation signal echo1 is a signal for removing echo noise included in a sensing signal $V_1$. That is, the compensation signal echo1 is a signal for detecting a signal $I_2$ transferred from the sensing signal $V_1$. Specifically, the sensing signal $V_1$ indicates a voltage at both ends of a first coil 113. However, the voltage at both ends of the first coil 113 is changed by a transmission signal ($I_1$ in FIG. 1) as well as a signal transferred from a second circuit unit 120. Accordingly, noise caused by the transmission signal $I_1$ must be removed to detect a signal ($I_2$ in FIG. 1) transferred from the sensing signal $V_2$. As will be described later, the compensation signal echo1 has a waveform corresponding to the transmission signal $I_1$. Thus, the noise caused by the transmission signal $I_1$ may be removed by subtracting the compensation signal echo1 from the sensing signal $V_1$. The compensation echo1 and removal of the noise will also be described later Reference is made to FIG. 6, which is a block diagram of an embodiment of the first output unit 114 shown in FIG. 3. The first output unit 114 of this example includes a subtractor 114a and a hysteresis comparator 114b.

The subtractor 114a subtracts a compensation signal echo1 from a sensing signal $V_1$ and outputs a result of the subtraction.

The hysteresis comparator 114b provides an output signal with reference to an output of the subtractor 114a. Specifically, the hysteresis comparator 114b removes noise that is not removed by the subtractor 114a. For achieving this, the hysteresis comparator 114b operates in synchronization with an enable signal enable1. In an exemplary embodiment, the hysteresis comparator 114b holds an output of the subtractor 114a at the rising edge of the enable signal enable1. In addition, the hysteresis comparator 114b provides the held output to the next rising edge of the enable signal enable1 as an output.

In an exemplary embodiment, the hysteresis comparator 114b does not hold an output of the subtractor 114a when the output of the subtractor 114a is lower than a first reference value and higher than a second reference value. In this case, the hysteresis comparator 114b maintains the previously held output to a new rising edge of the enable signal enable1.

In an exemplary embodiment, the hysteresis comparator 114b outputs a logic level HIGH when the output of the subtractor 114a is higher than a first reference value. On the other hand, the hysteresis comparator 114b outputs a logic level LOW when the output of the subtractor 114a is lower than a second reference value.

According to the above-described configuration, noise may be removed from the sensing signal $V_1$ and a transferred signal $I_2$ may be detected.

Figure 7:
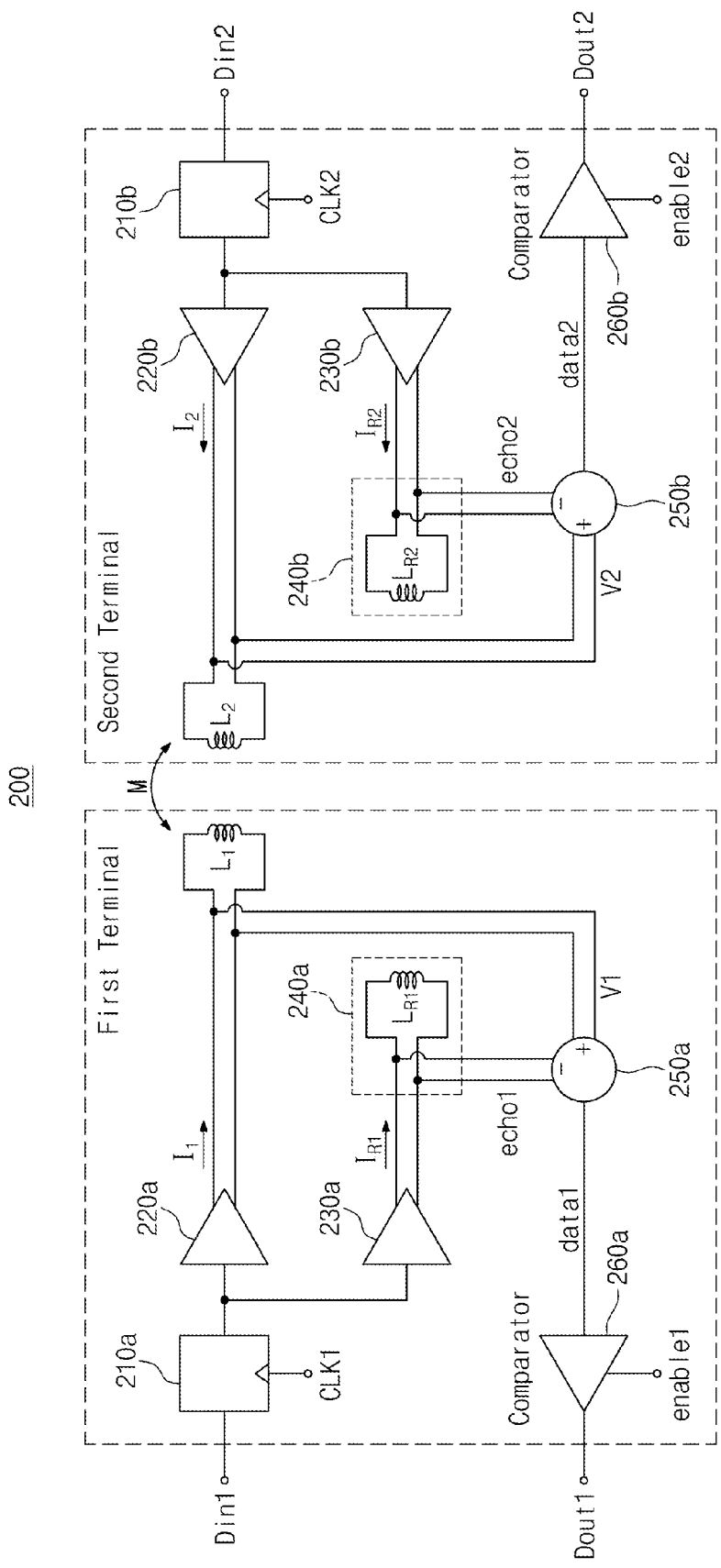
FIG. 7 is a circuit diagram of a data transmitting and receiving apparatus according to another embodiment of the inventive concept.

Reference is made to FIG. 7, which is a circuit diagram of a data transmitting and receiving apparatus 200 according to another embodiment of the inventive concept. The data transmitting and receiving apparatus 200 includes a first terminal and a second terminal.

The first terminal of this example includes a first coil $L_1$, a first flip-flop 210a, a first driver 220a, a first replica driver 230a, a first compensator 240a, a first subtractor 250a, and a first hysteresis comparator 260a.

Similarly, the second terminal of this example includes a second coil $L_2$, a second flip-flop 210b, a second driver 220b, a second replica driver 230b, a second compensator 240b, a second subtractor 250b, and a second hysteresis comparator 260b.

The first terminal and the second terminal are substantially identical in configuration and operation. Therefore, this embodiment will be described with respect to the first terminal only.

In this embodiment, a compensation coil $L_{R1}$ is used as the first compensator 240a. In an exemplary embodiment, inductances of the compensation coil $L_{R1}$ and the first coil $L_1$ may be equal to each other.

When an input signal Din1 is received to the first flip-flop 210a, the first flip-flop 210a buffers the input signal Din1 and outputs the buffered signal. The first flip-flop 210a operates in synchronization with a clock signal CLK1. The output of the first flip-flop 210a is provided to the first driver 220a and the first replica driver 230a.

The first driver 220a outputs transmission data $I_1$ with reference to the first flip-flop 210a. The transmission data $I_1$ may be a current signal. When the transmission data $I_1$ flows through a coil, the transmission data $I_1$ is transferred to the second terminal by inductance coupling.

The first replica driver 230a outputs replica current $I_{R1}$ with reference to the first flip-flop 210a. The replica current $I_{R1}$ is provided to the first compensator 240a. When the replica current $I_{R1}$ flows through the compensation coil $L_{R1}$, a voltage is induced at both ends of the compensation coil $L_{R1}$ by electromagnetic effect.

The first subtractor 250a receives a voltage at both ends of the first coil $L_1$ as a sensing signal $V_1$. In addition, the first subtractor 250a receives the voltage at both ends of the compensation coil $L_{R1}$ as a compensation signal echo1.

Hereinafter, an operation principle of the first subtractor 250a will now be described. First, components of the sensing signal $V_1$ are analyzed. At this point, the transmission data $I_1$ flows through the first coil $L_1$. Accordingly, the sensing signal $V_1$ includes a voltage drop caused by the transmission data $I_1$ and parasitic resistance, and a voltage drop caused by the transmission data $I_1$ and magnetic inductance of the first coil $L_1$.

The first coil $L_1$ is coupled with the second coil $L_2$ by mutual inductance M. Accordingly, the sensing signal $V_1$ includes voltage drop caused by the current $I_2$ flowing through the second coil $L_2$ and the mutual inductance M.

Next, components of a compensation signal echo1 are analyzed. The replica current $I_{RI}$ flows through the compensation coil $L_{RI}$. Accordingly, the compensation signal echo1 includes a voltage drop caused by the replica current $I_{R1}$ and parasitic resistance, and a voltage drop caused by the replica current $I_{R1}$ and magnetic inductance of the compensation coil $L_{RI}$.

Since the compensation coil $L_{RI}$ is not coupled with the second coil $L_2$, the compensation signal echo1 is not affected by mutual inductance.

In the meantime, since outputs of the driver 220a and the first replica driver 230a are identical to each other, their output waveforms are also identical to each other. In an exemplary embodiment, the intensity of the replica current $I_{R1}$ may be made equal to that of the transmission data $I_1$ through appropriate scaling. Further, the inductance of the compensation coil $L_{RI}$ may be set to be equal to that of the first coil $L_1$.

In this case, the compensation signal echo1 is made identical to a signal except for a component based on the mutual inductance M among the components of the sensing signal $V_1$.

The first subtractor 250a subtracts the compensation signal echo1 from the sensing signal $V_1$ and outputs a result of the subtraction. According to the above description, the output of the first subtractor 250a includes only a voltage drop caused by the current $I_2$ flowing through the second coil $L_2$ and the mutual inductance M between the first and second coils $L_1$ and $L_2$. That is, a noise component caused by the transmission data $I_1$ is removed from the sensing signal $V_1$.

The output of the first subtractor 250a is provided to the hysteresis comparator 260a to fully restore a signal transferred from the second terminal.

The first hysteresis comparator 260a operates in synchronization with an enable signal enable1. The operation of the first hysteresis comparator 260a is the same as that of the previously described hysteresis comparator 114b of FIG. 6).

The first hysteresis comparator 260a holds an input at the rising edge of the enable signal enable1. Thus, the signal transferred from the second terminal may be fully restored. The restored signal is provided as an output signal Dout1.

According to the above-describe configuration, the data transmitting and receiving apparatus 200 may perform interactive data communication through one channel. Thus, the data transmitting and receiving apparatus 200 may realize a relatively high data transfer rate and effective bandwidth.

Next, there is provided a data transmitting and receiving apparatus in which an inductor of FIG. 7 is replaced with a lower-cost resistor.

Figure 8:
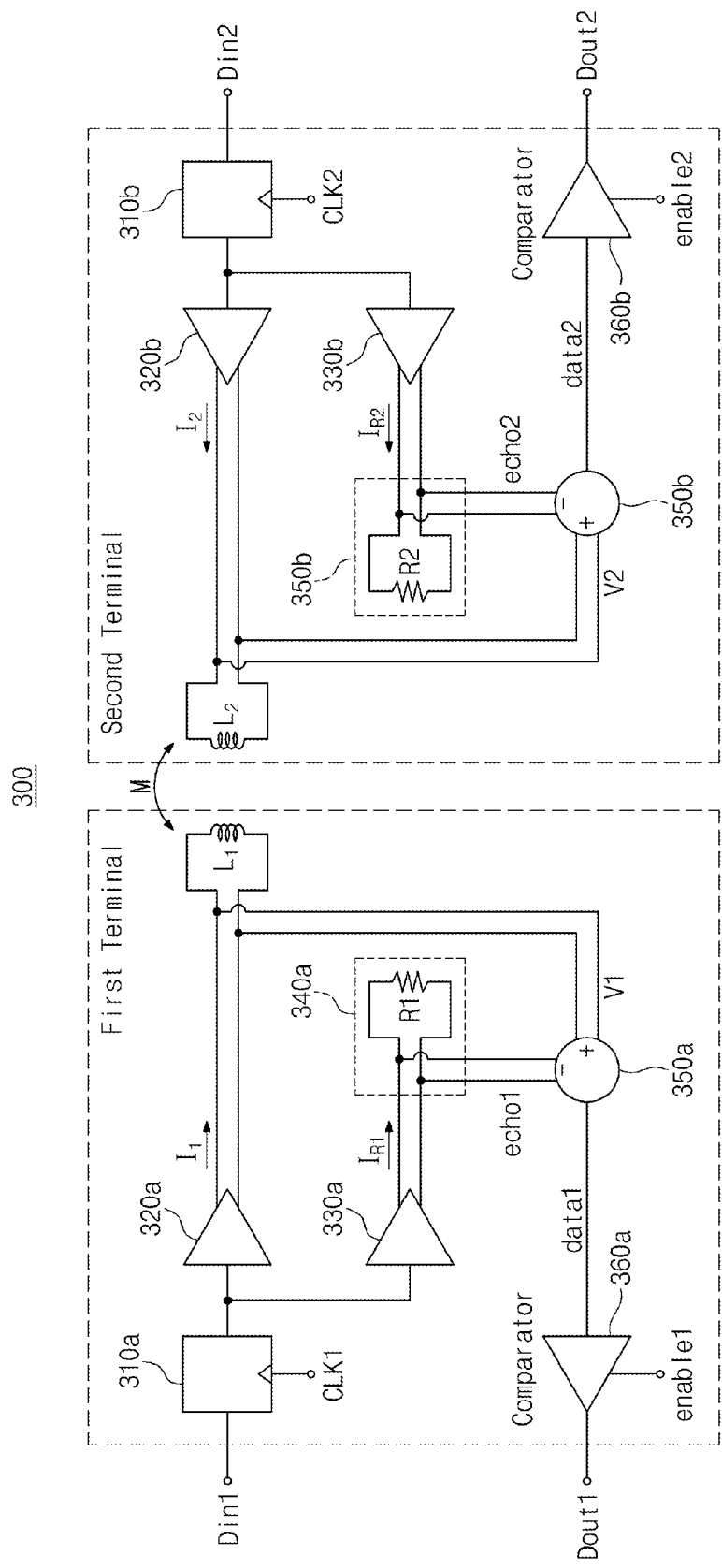
FIG. 8 is a circuit diagram of a data transmitting and receiving apparatus according to yet another embodiment of the inventive concept.

Reference is made to FIG. 8, which is a circuit diagram of a data transmitting and receiving apparatus 300 according to still another embodiment of the inventive concept. The data transmitting and receiving apparatus 300 includes a first terminal and a second terminal.

The first terminal of this example includes a first coil $L_1$, a first flip-flop 310a, a first driver 320a, a first replica driver 330a, a first compensator 340a, a first subtractor 350a, and a first hysteresis comparator 360a.

Similarly, the second terminal of this example includes a second coil $L_2$, a second flip-flop 310b, a second driver 320b, a second replica driver 330b, a second compensator 340b, a second subtractor 350b, and a second hysteresis comparator 360b.

The first terminal and the second terminal are substantially identical in configuration and operation. Therefore, this embodiment will be described with respect to the first terminal only.

In this embodiment, a compensator resistor $R_1$ is used as the first compensator 340a.

When the input signal Din1 is received to the first flip-flop 310a, the first flip-flop 310a buffers the input signal Din1 and outputs the buffered signal. The first flip-flop 310a operates in synchronization with a clock signal CLK1. The output of the first flip-flop 310a is provided to the first driver 320a and the first replica driver 330a.

The first driver 320a outputs transmission data $I_1$ with reference to the first flip-flop 310a. The transmission data $I_1$ may be a current signal. When the transmission data $I_1$ flows through a coil, the transmission data $I_1$ is transmitted to the second terminal by inductance coupling.

The first replica driver 330a outputs replica current $I_{R1}$ with reference to the first flip-flop 310a. The replica current $I_{R1}$ is provided to the first compensator 340a. When the replica current $I_{R1}$ flows through the compensation resistor $R_1$, a voltage drop occurs at both ends of the compensation resistor $R_1$.

The subtractor 350a receives a voltage at both ends of the first coil $L_1$ as a sensing signal $V_1$. In addition, the first subtractor 350a receives a voltage at both ends of the compensation resistor $R_1$ as a compensation signal echo1.

Hereinafter, an operation principle of the first subtractor 350a will now be described. First, components of the sensing signal $V_1$ are analyzed. At this point, the transmission data $I_1$ flows through the first coil $L_1$. Accordingly, the sensing signal $V_1$ includes a voltage drop caused by the transmission data $I_1$ and parasitic resistance, and a voltage drop caused by the transmission data $I_1$ and magnetic inductance of the first coil $L_1$.

The first coil $L_1$ is coupled with the second coil $L_2$ by mutual inductance M. Accordingly, the sensing signal $V_1$ includes a voltage drop caused by the current $I_2$ flowing through the second coil $L_2$ and the mutual inductance M.

Next, components of a compensation signal echo 1 are analyzed. The replica current $I_{R1}$ flows through the compensation coil $L_{R1}$. Accordingly, the compensation signal echo1 includes voltage drop ($I_{R1} \times R_1$) caused by the replica current $I_{R1}$ and the compensation resistor $R_1$.

A waveform of the compensation signal echo1 may be identical to that of a voltage drop caused by a parasitic resistor of the first coil $L_1$ through appropriate scaling. The compensation signal echo1 is subtracted from the sensing signal $V_1$. Accordingly, among the components of the sensing signal $V_1$, a component of voltage drop caused by the transmission data $I_1$ and the parasitic resistor may be removed.

However, although the above procedure is carried out, the sensing signal $V_1$ includes noise caused by the magnetic inductance of the first coil $L_1$. The transmission data $I_1$ of the first terminal and data $I_2$ transmitted from the second terminal have a phase difference of 180 degrees to remove the nose caused by the magnetic inductance of the first coil $L_1$.

This may be achieved through phase shift of clocks of the first flip-flop 310a and the second flip-flop 310b. That is, through the clock phase shift, an output of the first flip-flop 310a is phase-shifted by +90 degrees and an output of the second flip-flop 310b is phase-shifted by −90 degrees. As a result, the transmitted data $I_1$ and $I_2$ have a relative phase shift of 180 degrees.

When the transmitted data $I_1$ and $I_2$ have the relative phase shift of 180 degrees, noise caused by magnetic inductance may be removed. This is because the noise caused by magnetic inductance appears only at the rising edge of the first flip-flop 310a. In contrast, the data $I_2$ transmitted from the second terminal appears only at the falling edge of the first flip-flop 310a.

Accordingly, among the components of the sensing signal $V_1$, if only a component appearing at the falling edge of the first flip-flop 310a is output, the noise caused by magnetic inductance is removed. A more detailed description associated with this will be presented later with reference to FIG. 9.

The first subtractor 350a subtracts the compensation signal echo1 from the sensing signal $V_1$ and outputs a result of the subtraction. According to the above description, the output of the first subtractor 350a includes only a voltage drop caused by magnetic inductance $L_1$ of the first coil $L_1$ and mutual inductance M of the first and second coils. That is, a component of the noise caused by a parasitic resistor of the first coil is removed from the sensing signal $V_1$.

The output of the first subtractor 350a is provided to the first hysteresis comparator 360a to fully restore a signal transferred from the second terminal.

The first hysteresis comparator 360a operates in synchronization with the enable signal enable1. The operation of the first hysteresis comparator 360a is the same as that of the previously described hysteresis comparator 114b shown in FIG. 6.

The enable signal enable1 has a phase difference of 180 degrees with respect to a clock CLK1 of the first flip-flop 310a. The first hysteresis comparator 360a holds an input at the rising edge of the enable signal enable1. Thus, the noise caused by the magnetic inductance L1 may be removed and the signal transferred from the second terminal may be fully restored. The restored signal is provided as an output signal Dout1.

According to the above configuration, the data transmitting and receiving apparatus 300 may simultaneously perform interactive data communication through one channel. Thus, the data transmitting and receiving apparatus 300 may realize a relatively high data transfer rate and effective bandwidth.

Figure 9:
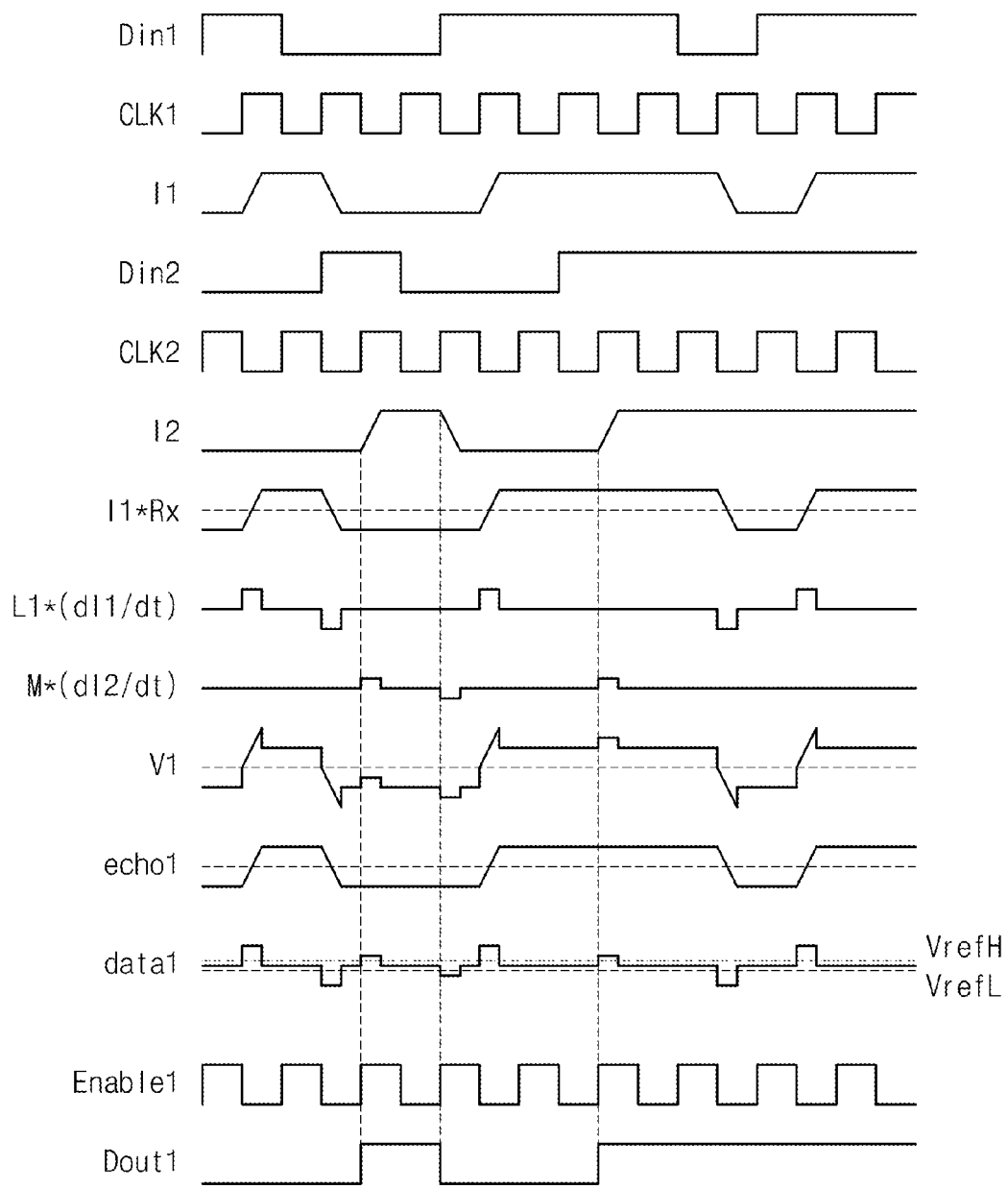
FIG. 9 is a timing diagram of a data transmitting and receiving apparatus according to an embodiment of the inventive concept.

Reference is made to FIG. 9, which is an exemplary operational timing diagram of the data transmitting and receiving apparatus shown in FIG. 8. Hereinafter, the operation of the apparatus of FIG. 8 will be further described with reference to FIGS. 8 and 9.

In this embodiment, a clock CLK1 of a first flip-flop 310a and a clock CLK2 of a second flip-flop 310b have a phase difference of 180 degrees with respect to each other. As a result, a signal $I_2$ received to a first coil $L_1$ from a second terminal (hereinafter referred to as "receiving data $I_2$") and transmitted data $I_1$ have a phase difference of 180 degrees with respect to each other.

A component based on a parasitic resistor of a first coil ($I_1*Rx$), a component based on magnetic inductance of the first coil ($L_1*(dI_1/dt)$), and a component based on mutual inductance ($M*(dI_2/dt)$) are all added to the sensing signal $V_1$. The component based on mutual inductance ($L_1*(dI_1/dt)$) appears at the rising edge of the clock CLK1. To the contrary, the component based on mutual inductance ($M*(dI_2/dt)$) appears at the falling edge of the clock CLK1 because the transmission data $I_2$ has a phase difference of 180 degrees.

Since the compensation signal echo1 includes only a component of voltage drop caused by a resistor, the compensation signal echo1 has the same waveform as the component based on a parasitic resistor of a first coil ($I_1*Rx$). Through appropriate scaling, the compensation signal echo1 may be set to the intensity equivalent to the component ($I_1*Rx$).

A signal data1 is an output of the first subtractor 350a. The signal data1 appears as a result of subtracting the compensation signal echo1 from the sensing signal $V_1$. The signal data1 is provided to the first hysteresis comparator 360a.

The first hysteresis comparator 360a removes the component based on magnetic inductance of the first coil ($L_1*(dI_1/dt)$) among components included in the signal data1. The component removal may be achieved by making the enable signal enable1 have a phase difference of 180 degrees with respect to the clock CLK1. This is because the transmission data $I_1$ appears at the rising edge of the clock CLK1 and the receiving data $I_2$ appears at the falling edge of the clock CLK2.

An output of the first hysteresis comparator 360a is provided as an output signal Dout1. It may be confirmed that the output signal Dout1 is a noise-removed signal and a fully restored version of the second terminal input signal Din2.

According to the above configuration, the data transmitting and receiving apparatus 300 may simultaneously perform interactive data communication through one channel. Thus, the data transmitting and receiving apparatus 300 may realize a relatively high data transfer rate and effective bandwidth.

Figure 10:
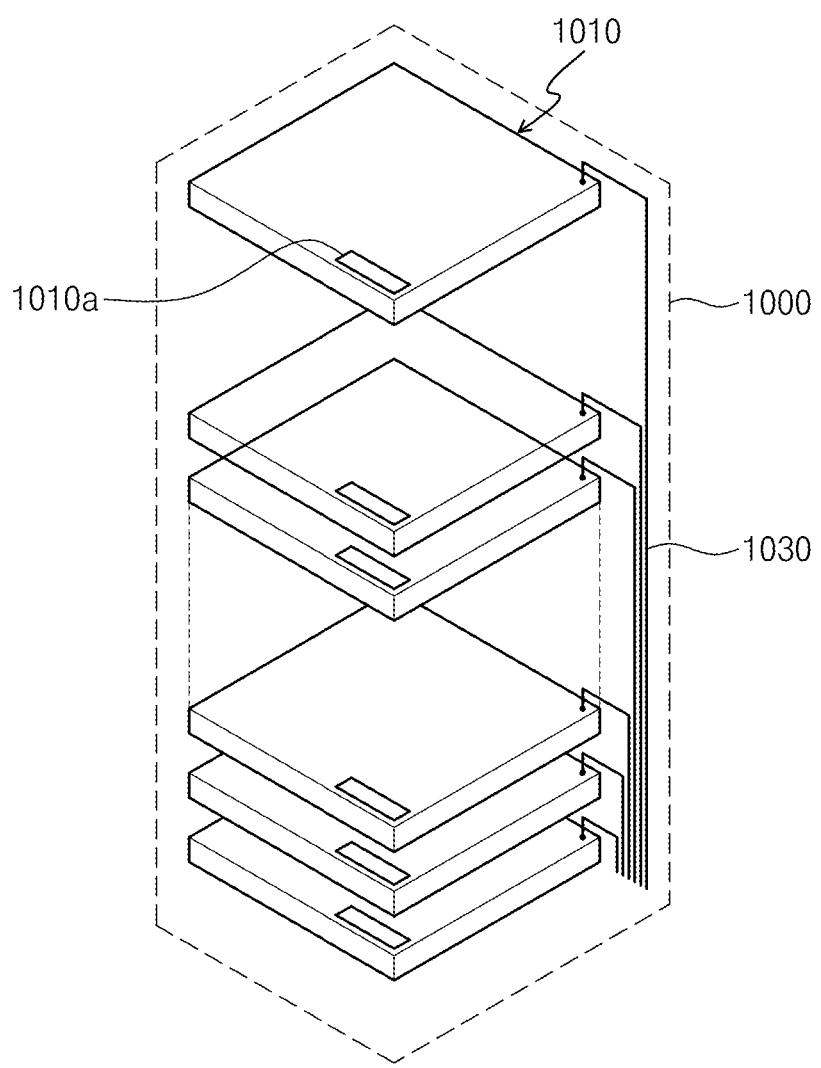
FIG. 10 is a schematic view of a solid state drive (SSD) according to an embodiment of the inventive concept.

Reference is now made to FIG. 10, which illustrates a solid state drive (SSD) according to an embodiment of the inventive concept.

The SSD 1000 of this example includes a plurality of stacked semiconductor chips 1010. The semiconductor chips 1010 may include multiple NAND flash memory chips or the like, and one or more semiconductor chips 1010 may be a memory controller. In this embodiment each of the semiconductor memory chips includes a contactless communication terminal circuit 1010a which is in accordance with one or more of the embodiments described above in connection with FIGS. 3-9, thereby allowing interactive data communication among the semiconductor chips 1010. Also shown in FIG. 10 are wirings for supplying power to the semiconductor chips 1010, although it is well understood that other known techniques for supplying power may be adopted.

While the inventive concept has been particularly shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A data transmitting and receiving apparatus comprising:
   a coil configured to both transmit and receive data through inductive coupling, wherein a voltage drop across the coil constitutes a sensing signal;
   an input unit, having an output connected across the coil, configured to generate transmission data and a replica signal in accordance with an input data signal, the transmission data being supplied from the output of the input unit to the coil;
   a replica unit configured to generate a compensation signal in accordance with the replica signal; and
   an output unit, having an input connected across the coil in parallel with the output of the input unit, configured to extract reception data from the sensing signal using the compensation signal.

2. The data transmitting and receiving apparatus of claim 1, wherein the input unit operates in synchronization with a clock signal and includes a flip-flop configured to buffer the input data signal and output a buffered signal as the replica signal.

3. The data transmitting and receiving apparatus of claim 2, wherein the input unit further includes a driver configured to provide the transmission data to the coil in accordance with the buffered signal output from the flip-flop.

4. The data transmitting and receiving apparatus of claim 2, wherein the output unit includes a subtractor configured to subtract the compensation signal from the sensing signal and output a result of the subtraction.

5. The data transmitting and receiving apparatus of claim 4, wherein the output unit further includes a hysteresis comparator operating in synchronization with an enable signal and configured to output the reception data in accordance with the result of subtraction from the subtractor.

6. The data transmitting and receiving apparatus of claim 5, wherein an effective input value of the hysteresis comparator is higher than a first reference value or lower than a second reference value.

7. The data transmitting and receiving apparatus of claim 6, wherein the hysteresis comparator outputs a logic level HIGH as the output signal when the result of subtraction from the subtractor is higher than the first reference value.

8. The data transmitting and receiving apparatus of claim 6, wherein the hysteresis comparator outputs a logic level LOW as the output signal when the result of subtraction from the subtractor is lower than the second reference value.

9. The data transmitting and receiving apparatus of claim 5, wherein the replica signal has a same waveform as the input data signal and the replica unit includes a compensation coil.

10. The data transmitting and receiving apparatus of claim 5, wherein the replica signal has a same waveform as the input signal and the replica unit includes a compensation resistor.

11. The data transmitting and receiving apparatus of claim 10, wherein the enable signal has a phase difference of 180 degrees with respect to the clock signal.

12. A data transmitting and receiving method comprising:
receiving an input data signal;
generating a transmission data and a replica signal in accordance with the input data signal;
simultaneously transmitting the transmission data inductively and receiving reception data inductively via a same induction coil, wherein a voltage drop across the coil during the simultaneous transmitting and receiving constitutes a sensing signal;
generating a compensation signal in accordance with the replica signal; and
extracting the reception data from the sensing signal using the compensation signal.

13. The data transmitting and receiving method of claim 12, wherein the compensation signal is subtracted from the sensing signal to obtain a subtraction result.

14. The data transmitting and receiving method of claim 13, wherein the subtraction result is applied to a hysteresis comparator operating in synchronization with an enable signal to obtain the reception data.

15. The data transmitting and receiving method of claim 14, wherein generating the compensation signal includes applying the replica signal to a driver having an output connected across a compensation resistor, and
wherein the transmission data has a phase difference of 180 degrees with respect to the reception data.

16. A solid state drive (SSD) comprising a plurality of stacked semiconductor chips, at least one of which is memory chip, wherein each of the semiconductor chips includes a contactless communication terminal comprising:

a coil configured to both transmit and receive data through inductive coupling, wherein a voltage drop across the coil constitutes a sensing signal;
an input unit, having an output connected across the coil, configured to generate transmission data and a replica signal in accordance with an input data signal, the transmission data being supplied from the output of the input unit to the coil;
a replica unit configured to generate a compensation signal in accordance with the replica signal; and
an output unit, having an input connected across the coil in parallel with the output of the input unit, configured to extract reception data from the sensing signal using the compensation signal.

17. The SSD of claim 16, wherein at least one other of the semiconductor chips is a memory controller.

18. The SSD of claim 16, wherein the memory chip is a NAND flash memory chip.

19. The SSD of claim 16, wherein the input unit operates in synchronization with a clock signal and includes a flip-flop configured to buffer the input data signal and output a buffered signal as the replica signal.

20. The SSD of claim 19, wherein the input unit further includes a driver configured to provide the transmission data to the coil in accordance with the buffered signal output from the flip-flop,
wherein the output unit includes a subtractor configured to subtract the compensation signal from the sensing signal and output a result of the subtraction, and
wherein the output unit further includes a hysteresis comparator operating in synchronization with an enable signal and configured to output the reception data in accordance with the result of subtraction from the subtractor.

* * * * *